United States Patent [19]
Dodrill

[11] Patent Number: 4,696,369
[45] Date of Patent: Sep. 29, 1987

[54] SPEAKER AND BAFFLE SYSTEM FOR A VEHICLE STORAGE WELL AND METHOD OF INSTALLING SAME

[76] Inventor: Gregg W. Dodrill, 7308 Campbell Rd., Dallas, Tex. 75248

[21] Appl. No.: 882,226

[22] Filed: Jul. 7, 1986

[51] Int. Cl.⁴ .................................................. H05K 5/00
[52] U.S. Cl. ...................................... 181/141; 181/144; 181/156; 181/199; 381/86
[58] Field of Search ............... 181/141, 199, 144, 156; 381/86

[56] References Cited

U.S. PATENT DOCUMENTS

| | | | |
|---|---|---|---|
| 4,144,416 | 3/1979 | Babb | 181/156 X |
| 4,582,162 | 4/1986 | Katsuno | 181/141 |
| 4,597,470 | 7/1986 | Takagi et al. | 181/141 |

FOREIGN PATENT DOCUMENTS 3407300  9/1985  Fed. Rep. of Germany ...... 181/150

*Primary Examiner*—Benjamin R. Fuller
*Attorney, Agent, or Firm*—Warren B. Kice

[57] ABSTRACT

A speaker or baffle system for speakers which is installed in a well of a vehicle to form an enclosure for the volume of air in said well. At least one loudspeaker extends through an opening formed in the baffle in communication with said well. The baffle can form the upper portion of a full enclosure that fits into said well or can be supported by a pair of side panels extending from the floor of the well.

3 Claims, 3 Drawing Figures

U.S. Patent    Sep. 29, 1987    4,696,369
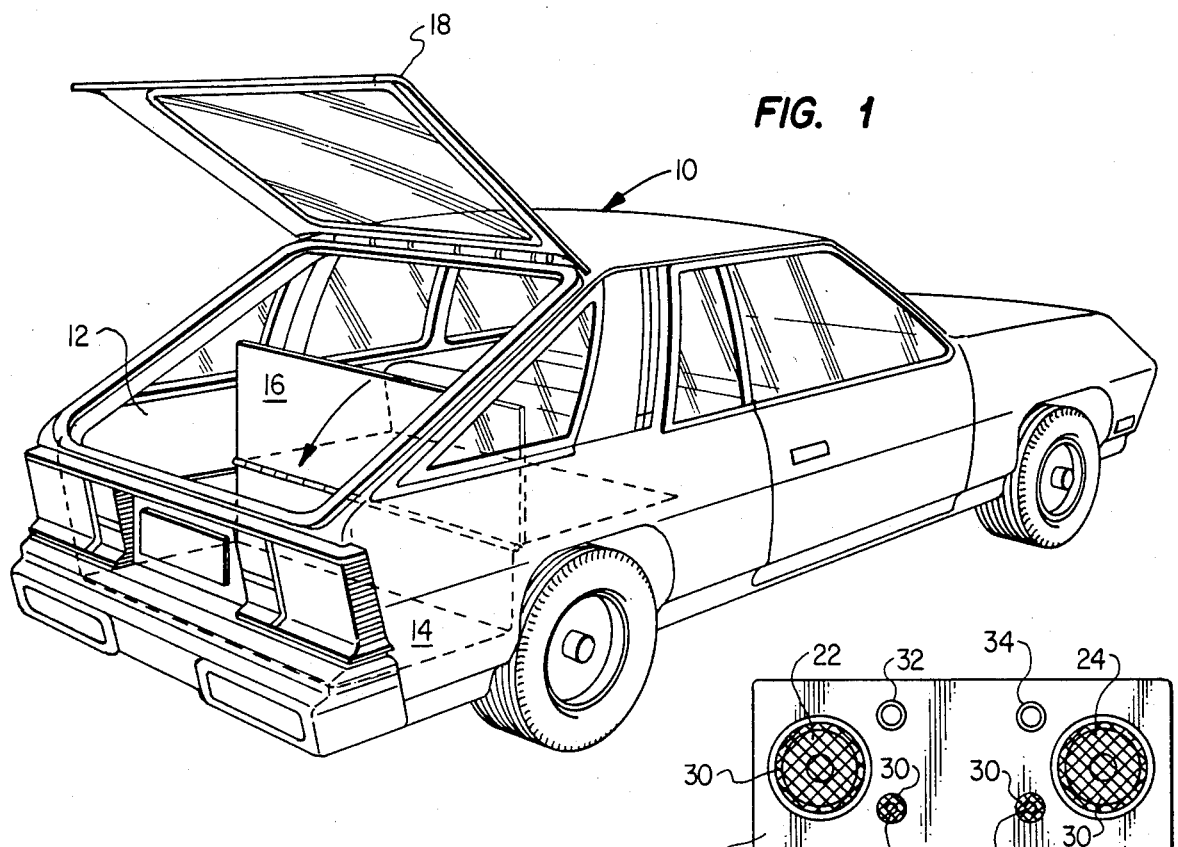
FIG. 1
FIG. 2
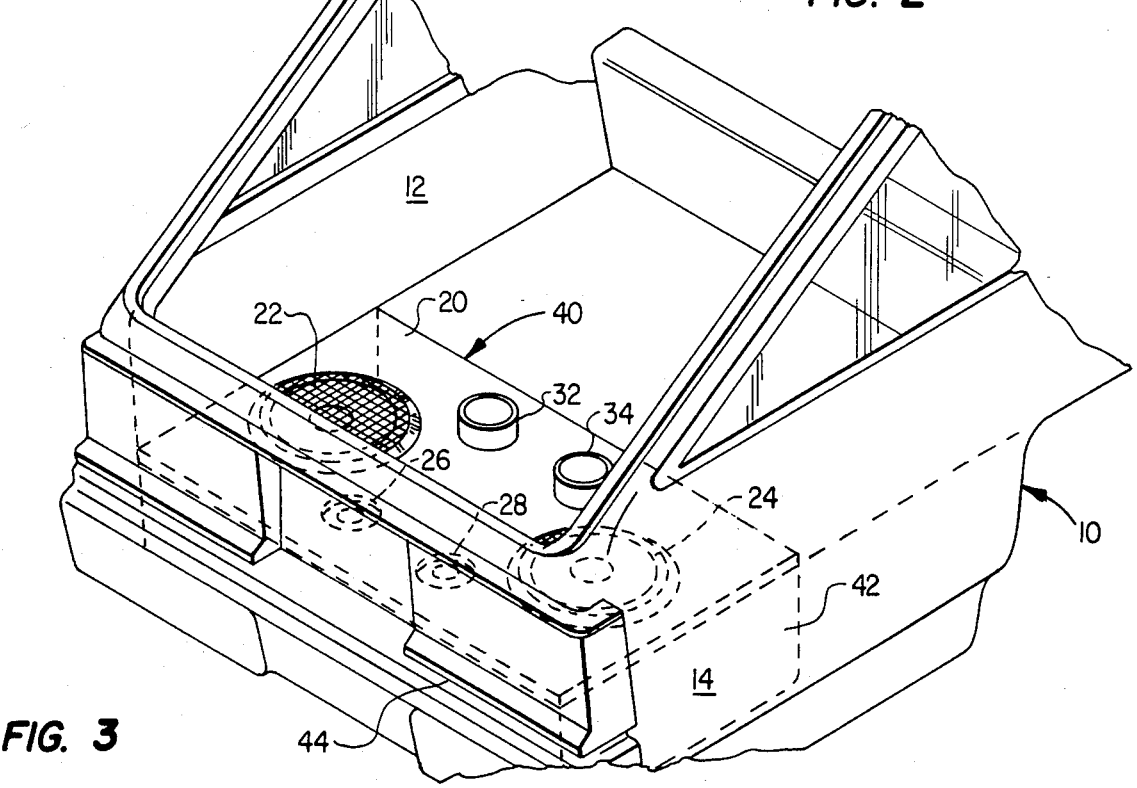
FIG. 3

4,696,369

SPEAKER AND BAFFLE SYSTEM FOR A VEHICLE STORAGE WELL AND METHOD OF INSTALLING SAME

BACKGROUND OF THE INVENTION

This invention relates to a speaker or baffle system for speakers for installation in a vehicle and a method of installing same. More particularly, the invention relates to such a system and method which is designed to fit within a storage well formed in the vehicle.

With the advent of sophisticated electronics that are suitable for installation in an automobile including cassette decks, compact disk players, and FM tuners along with the availability of relatively high power amplifiers, a corresponding demand has risen for high quality loudspeaker systems. However, due to space limitations and standardized formats, it is often difficult, if not impossible, to provide loudspeaker systems that match the power and sophistication of the corresponding electronics.

Although most automobiles do have available space for mounting loudspeakers, such as the rear deck of a vehicle extending behind the rear seat and communicating with the trunk of the vehicle, it is difficult to design an optimum loudspeaker system for this space since the trunk size varies, making it impossible to properly tune the loudspeaker to the "enclosure" formed by the trunk.

Further, the speaker systems that are available for vehicles normally require fairly extensive alterations of the interiors of the vehicles including the cutting of fairly large holes in the door panels, the rear decks, etc.

SUMMARY OF THE INVENTION

It is therefore an object of the present invention to provide a speaker system of the above type and a method of installing same in which a baffle is mounted over an existing storage well formed in a vehicle to form an enclosure for the volume of air in the well, and one or more loudspeakers are mounted on the baffle.

It is a still further object of the present invention to provide a speaker system and method of the above type in which the baffle forms the upper portion of a full enclosure that fits into the well of the vehicle.

It is a still further object of the present invention to provide a speaker system and method of the above type which provides superior frequency response and base response when installed in a vehicle.

It is a further object of the present invention to provide a speaker system and method of the above type in which the loudspeakers are installed in a vehicle without the need of cutting holes, or the like, in the interior of the vehicle.

It is a further object of the present invention to provide a speaker system and method of the above type in which the system can be optimally tuned to a specific space formed in the vehicle.

It is a further object of the present invention to provide a speaker system and method of the above type in which a well, which is provided in the vehicle for storage purposes, is converted into an enclosure for a speaker system.

Toward the fulfillment of these and other objects, the speaker system of the present invention includes a baffle plate which extends over an existing storage well formed in vehicle to form an enclosure for the volume of air in the well. One or more loudspeakers can be mounted on the baffle and extend through an opening formed in the baffle in communication with said well. The baffle can form the upper portion of a full enclosure that fits into said well or can be supported by a pair of side panels extending from the floor of the well.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein:

FIG. 1 is a perspective view depicting a vehicle in which the speaker system of the present invention is designed to be installed;

FIG. 2 in a plan view of the speaker system of the present invention; and

FIG. 3 is a view showing the speaker system of present invention installed in the vehicle of FIG. 1.

DESCRIPTION OF THE PREFERRED EMBODIMENTS

Referring specifically to the drawings, the reference numeral 10 refers in general to a vehicle which is of the "hatchback" type having a rear storage compartment shown in general by the reference numeral 12. A well 14 is formed in the compartment 12 which is normally utilized for storage purposes and is normally provided with a lid 16 which extends coextensively with the floor, or deck, of the compartment, and which can be pivoted upwardly to the position shown to expose the interior of the storage well 14. The vehicle 10 has a hinged door, or window, 18 which can be pivoted to the position shown to permit access to the storage compartment 12 and therefore the well 14.

Referring specifically to FIG. 2 of the drawings, the lid 16 of the well 14 has been removed and reference numeral 20 refers to a baffle which may be in the form of a high density board or similar material which is configured identically to that of the lid 16 with the exception it has an extended thickness, such as ¾ inch, to render it relatively rigid. The baffle 20 extends over the well 14 to form a sealed enclosure and is mounted flush with the deck of the compartment 12 as will be explained in detail later.

A pair of low frequency loudspeakers, or drivers 22 and 24 extend through corresponding spaced openings formed in the baffle 20 and a pair of high frequency drivers 26 and 28 extend through corresponding openings also formed in the baffle 20. The drivers 22, 24, 26 and 28 are thus in communication with the well 14 and are mounted relative to the baffle 20 in a conventional manner which normally entails a plurality of wood screws extending through appropriate openings formed in the drivers and into to the baffle 20 to secure the drivers in an air tight manner relative to the baffle 20. Each driver has a grill 30 extending over to protect same, also in a conventional manner. In a stereophonic reproduction system the drivers 22 and 26 together would produce the entire frequency range of one "channel" while the drivers 24 and 28 would produce the entire frequency range of the other channel. In this context, a suitable crossover network (not shown) would be provided to selectively distribute the audio signals to the drivers 22 and 26 and to the drivers 24 and 28.

A pair of tubular ducts 32 and 34 extend through corresponding openings formed in the baffle 20, and are located adjacent to their corresponding low frequency drivers 22 and 24, respectively. The purpose of the tubular ducts will be described in detail later.

The baffle 20, along with the corresponding drivers 22, 24, 26 and 28 are installed in the vehicle as better shown in connection with FIG. 3. More particularly, the lid 16 normally enclosing the well 14 is removed and the baffle 20 is placed over the top of the well and is mounted in the position shown coextensively with the remaining deck portion of the compartment 12 in any conventional manner such as by bolting, wedging or the like. It is understood that suitable sealing techniques can be provided for rendering the enclosure thus formed air tight.

The tubular ducts 32 and 34 are dimensioned both with respect to diameter and length to a specific size corresponding to the size of the enclosure thus formed in accordance with conventional techniques to exert a maximum acoustical impedance on the cones of the low frequency drivers 22 and 24, at a frequency that produces a maximum electrical impedance when the driver operates in the enclosure formed by the well 14 and the baffle 20. Sizing the tubular ducts 32 and 34 is an empirical process which is related to both the enclosure parameters and the characteristics of the drivers, and is well documented in the literature. For example, see David B. Weems "Taming the Base Reflex", *Radio-Electronics*, February 1975, Pages 58-61. Since this is a conventional technique it will not be described in any further detail.

According to an alternate embodiment of the present invention, instead of providing merely a single baffle over the well 14, an entire enclosure including the baffle 20 as the top, can be inserted in the well, with minimum clearance, as shown in FIG. 3. The entire enclosure, is shown, in general, by the reference numeral 40 and includes the baffle 20, a pair of side panels, one of which is shown by the reference numeral 42, a pair of end panels, one of which is shown by the reference numeral 44, and a lower panel (not shown). The enclosure 40 including the baffle 20 can be contructed of a fairly rigid and dense material such as hard wood, or the like, to form an enclosure of increase rigidity thus further improving the response of the speaker system of the present invention.

According to another alternative embodiment, an assembly, including the panel 20 and the two side panels 42, can be provided which extends within the well as shown in FIG. 3. The side panels 42 extend from the floor of the well in an abutting or near-abutting relationship with the side walls of the well to support the baffle 20 in the position shown and discussed above. This baffle system can be marketed and installed without any drivers, thus giving the owner of the vehicle the option of installing the drivers of his choice.

Several advantages result from the foregoing. For example, the speaker system or baffle system of the present invention is designed to be utilized in an existing well in the vehicle which is normally used for storage purposes and which does not require any cutting or alterations in the interior of the vehicle. Also, by virtue of being placed in the well of the vehicle, the system of the present invention is fairly unobstrusive and does not project into the interior of the vehicle. Also, the drivers mounted on the baffle can be optimally tuned to the specific enclosure placed in the well of the vehicle or formed in part by the well, and, as a result, enjoys a superior frequency response and base response when compared to conventional systems.

Other modifications, changes and substitutions are intended in the foregoing disclosure and in some instances some features of the invention will be employed without a corresponding use of other features. Accordingly it is appropriate that the appended claims be construed broadly and in a manner consistent with the spirit and scope of the invention.

What is claimed is:

1. A speaker system for use with a storage well formed in the rear floor of a vehicle, said speaker system comprising an enclosure dimensioned to fit within said well with minimum clearance and enclosing a fixed volume of air; said enclosure including a baffle extending over said well and flush with said floor; at least one loudspeaker mounted on said baffle and extending through a corresponding opening formed through said baffle for interacting with said volume of air; and means for venting said enclosure a predetermined amount to optimally tune said speaker to said volume of air.

2. The speaker system of claim 1 wherein said venting means comprises at least one tubular duct extending through an additional opening formed through said baffle, the length and diameter of said tubular duct being selected relative to said volume of air to exert a maximum acoustical impedance on the cone of said loudspeaker at the frequency that produces maximum electrical impedance.

3. The speaker system of claim 1 wherein said enclosure further comprises a pair of side panels and a pair of end panels extending downwardly from said baffle plate and into said well with minimum clearance.

* * * * *